United States Patent
Ledoux et al.

(10) Patent No.: US 10,639,945 B2
(45) Date of Patent: May 5, 2020

(54) SYSTEM FOR ASSESSING THE CONDITION OF A TIRE

(71) Applicant: COMPAGNIE GENERALE DES ETABLISSEMENTS MICHELIN, Clermont-Ferrand (FR)

(72) Inventors: Thomas Ledoux, Clermont-Ferrand (FR); Denis Martin, Clermont-Ferrand (FR); Alexandre Pernot, Clermont-Ferrand (FR); Guillaume Heredia, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 267 days.

(21) Appl. No.: 15/746,290

(22) PCT Filed: Jul. 29, 2016

(86) PCT No.: PCT/EP2016/068141
§ 371 (c)(1),
(2) Date: Jan. 19, 2018

(87) PCT Pub. No.: WO2017/017249
PCT Pub. Date: Feb. 2, 2017

(65) Prior Publication Data
US 2018/0215211 A1    Aug. 2, 2018

(30) Foreign Application Priority Data
Jul. 30, 2015   (FR) ...................... 15 57304

(51) Int. Cl.
*G01M 17/02*    (2006.01)
*B60C 23/04*    (2006.01)

(52) U.S. Cl.
CPC ...... *B60C 23/0479* (2013.01); *B60C 23/0408* (2013.01); *B60C 23/0422* (2013.01); *G01M 17/02* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

2008/0256815 A1   10/2008   Schafer
2009/0000370 A1    1/2009   Lionetti et al. ................. 73/146
(Continued)

FOREIGN PATENT DOCUMENTS

WO    WO 2012/140367 A2    10/2012

OTHER PUBLICATIONS

M.C. O'Connor et al., "Michelin Shrinks Its eTire Pressure Monitor: The company's new UHF RFID tag and sensor module can be attached to a truck tire's inside wall without affecting vehicle or tag performance at higher speeds," RFID Journal, Jan. 8, 2007, pp. 1-3.
(Continued)

*Primary Examiner* — Andre J Allen
(74) *Attorney, Agent, or Firm* — Venable LLP (57) ABSTRACT

A system is provided for assessing a condition of a tire. The system includes first and second individual modules, a data transmission gateway, and a collaboration device. The first and second individual modules are for assessing the condition of the tire. Each of the first and second individual modules includes a housing, which is structured to be placed on a ground surface, and a data transmitter. The housing includes at least one detector arranged to enable a parameter of the tire to be assessed as the tire passes over the housing. The data transmission gateway is structured to transmit data between the first and second individual modules and a
(Continued)

remote database. The collaboration device is structured to enable data from the first individual module to be used collaboratively with data from the second individual module.

10 Claims, 5 Drawing Sheets

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/04; B60C 23/0493; B60C 23/0498; B60C 23/0496; B60C 23/064; B60C 23/0408; B60C 23/041; B60C 23/0411; B60C 23/0488; B60C 23/20; B60C 11/243; B60C 11/246; B60C 23/06; B60C 23/00; B60C 23/0486; B60C 23/061; B60C 11/0083; B60C 13/003; B60C 2009/2038; B60C 23/003; B60C 23/004; B60C 23/02; B60C 23/0401; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0406; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| 2012/0067115 | A1* | 3/2012 | Pingel | G01B 11/22 73/146 |
|---|---|---|---|---|
| 2014/0104052 | A1 | 4/2014 | Hammer | 340/447 |
| 2015/0174967 | A1* | 6/2015 | Lehmann | B60C 11/246 73/146 |
| 2016/0153763 | A1 | 6/2016 | Ledoux et al. | G01B 7/26 |
| 2016/0161243 | A1 | 6/2016 | Ledoux et al. | G01B 7/26 |
| 2016/0169657 | A1 | 6/2016 | Ledoux et al. | G01B 7/26 |
| 2017/0038278 | A1 | 2/2017 | Ledoux et al. | G01M 17/02 |
| 2017/0301103 | A1* | 10/2017 | Gonzaga | H04N 13/254 |
| 2017/0322012 | A1 | 11/2017 | Ledoux et al. | G01B 7/10 |
| 2017/0322117 | A1 | 11/2017 | Ledoux et al. | G01M 17/02 |
| 2017/0350781 | A1 | 12/2017 | Ledoux et al. | G01L 17/005 |
| 2017/0350792 | A1 | 12/2017 | Ledoux et al. | G01M 17/021 |
| 2018/0009271 | A1 | 1/2018 | Ledoux et al. | B60C 11/246 |
| 2018/0244341 | A1* | 8/2018 | Urban | H02K 11/21 |
| 2019/0001757 | A1* | 1/2019 | Singh | B60C 11/246 |

OTHER PUBLICATIONS

"Purce électronique dans les pneus. La 1$^{ADDAC;Aaere}$ manche à Goodyear," Le Pneumatique, No. 92, Jun. 1, 2007, pp. 1-6.
Sep. 30, 2016 International Search Report and Written Opinion in International Patent Appln. No. PCT/EP2016/068141.
International Search Report issued by WIPO dated Sep. 30, 2016, in connection with International Application No. PCT/EP2016/068141 (with English translation attached).
Written Opinion published by WIPO dated Feb. 2, 2017, in connection with International Application No. PCT/EP2016/068141 (in French; no English translation presently is available).

* cited by examiner

SYSTEM FOR ASSESSING THE CONDITION OF A TIRE

FIELD OF THE INVENTION

The present invention relates to a system for assessing the condition of a tire, and particularly although not exclusively the degree of wear of a tire.

RELATED ART

As is known, the tread of a pneumatic tire, whether it is intended to be fitted to a passenger, heavy goods, civil engineering or other vehicle is provided with a pattern comprising, in particular, pattern elements or elementary blocks delimited by various longitudinal, transverse or else oblique main grooves, it further being possible for the elementary blocks to comprise various thinner incisions or sipes. The grooves form channels for draining off water when running on wet ground and define the leading edges of the pattern elements.

When a pneumatic tire is new, the tread is at its maximum height. This initial height can vary depending on the type of pneumatic tire in question and the use for which it is intended; for example, "winter" tires generally have a pattern depth greater than that of "summer" tires. When the pneumatic tire wears down, the height of the elementary blocks of the pattern decreases and the stiffness of these elementary blocks increases. The increase in the stiffness of the elementary pattern blocks causes a reduction in some performance characteristics of the tire, such as the grip on wet ground. In addition, the water draining capacities decrease significantly when the depth of the channels of the patterns decreases.

It is therefore desirable to be able to monitor the progression of the wear of the tread of a pneumatic tire.

It is also beneficial, in the context of managing fleets of vehicles, to be able to monitor the change in other parameters indicative of the condition of a tire, for example a tire pressure.

A measurement system comprising a rolling bench intended to accommodate the passage of a vehicle is known from document US 2009/0000370. The system comprises an energy source that emits a wireless signal in the direction of the tire, and a sensor which detects a signal emitted in return by the tire. Using this return signal, a monitoring unit determines the depth of the pattern of the tire. However, it was found that this system requires a constant power supply to the various elements, and thus offers only low autonomy.

The present invention seeks to overcome this disadvantage, by proposing an autonomous system for assessing the condition of a tire. The present invention also seeks to propose a system that is easy for a fleet manager to install, and which can be adapted to suit different types of vehicle and different wheel and axle configurations.

BRIEF DESCRIPTION OF THE INVENTION

Thus, the invention relates to a system for assessing the condition of a tire, the system comprising at least a first and a second individual module for assessing the condition of a tire,
each individual module comprising a housing placed on the ground, this housing containing at least one detection device allowing a parameter of the tire to be assessed as the tire passes over the said housing, and data transmission means, the said system further comprising
a remote database and a data transmission gateway for the transmission of data between the individual modules and the database, and
means of collaboration between the first and second individual modules.

In one preferred embodiment, the first and second individual modules are positioned adjacent to each other. Specifically, such positioning makes it possible to offer a greater module width, and thus allows wider tires to be assessed. That also makes it possible to assess twin tires in a single pass.

In this context, it is therefore beneficial to be able to determine, when two adjacent modules are taking two measurements, whether these measurements correspond to two tires, or whether they represent two partial assessments of the one same tire.

To this end, in one particular embodiment, each individual module comprises an RFID chip reader which makes it possible to detect a single, or several, RFID identifiers situated on the vehicle the tires of which are being assessed or in the tires being assessed.

In the case where two modules are making a partial assessment of the one same tire, it is beneficial to be able to process the information coming from the two modules and combine it to reconstruct a full assessment of the condition of the tire.

Thus, in one particular embodiment, the means of collaboration comprise means of regularly synchronizing each of the individual modules and the data transmission gateway. In one exemplary embodiment, each individual module at regular intervals transmits the clock signal indicated by its internal clock to a gateway. Thus, the discrepancy between the clocks of each and the clock of the gateway is known.

It is then possible to use time-adjustment means installed, for example, in the gateway, to reconstruct the assessment of the condition of the tire.

As indicated hereinabove, a system according to the invention can be used to assess various parameters of a tire. In one particular exemplary embodiment, each individual module comprises at least one sensor using a magnetic field source, these sensors notably making it possible to measure tire wear. Use is made for example of eddy current sensors or of variable-reluctance sensors.

In this case, and in order to avoid any one sensor causing interference on another, it is beneficial for the sensors to be positioned in such a way that the distance between two adjacent sensors is constant, whatever the individual module in which the sensor is installed.

In one embodiment, the remote database contains information indicative of the positioning of the individual modules relative to one another.

In another embodiment, the means of collaboration comprise mechanical means of collaboration.

In yet another embodiment, the means of collaboration comprise means of reconstructing complete measurements from partial measurements taken on the one same tire.

BRIEF DESCRIPTION OF THE FIGURES

Other objectives and advantages of the invention will become clearly apparent in the following description of a preferred, but non-limiting, embodiment, illustrated by the following figures in which.

DESCRIPTION OF THE BEST EMBODIMENT OF THE INVENTION

Figure 1:
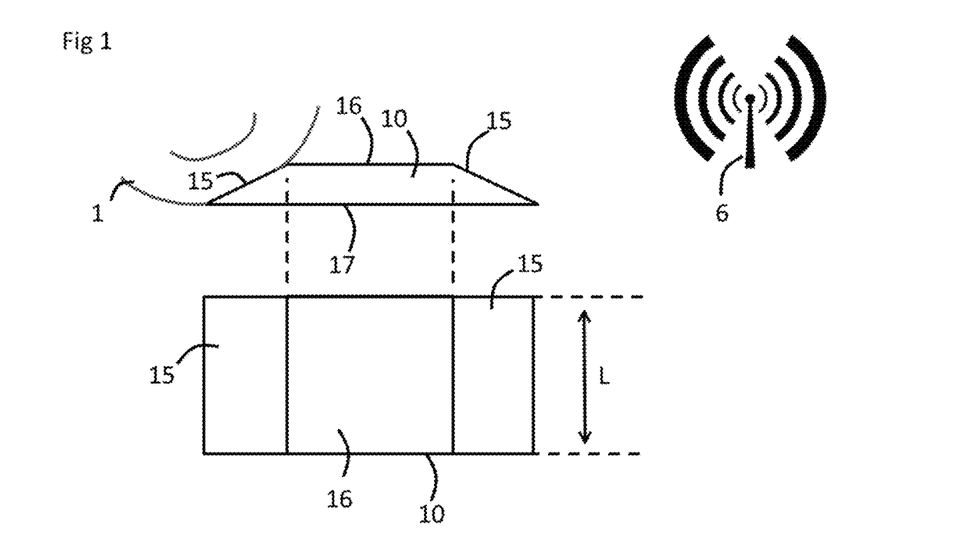
FIG. 1 shows an exemplary embodiment of an individual module for measuring the condition of a tire, used in a system according to the invention.

FIG. 1 shows an exemplary embodiment of an individual module comprising a measurement housing 10 used in a system according to the invention. In the rest of the description, the terms "housing" and "individual module" will be used interchangeably to refer to the physical element placed on the ground.

The module 10 is made up of two access ramps 15 and of a horizontal measurement zone 16. It is designed in such a way that it can be placed on flat ground and fixed to this ground, for example using screws.

The module has dimensions chosen so as to be easily transportable. Thus, advantageously, its width L is less than 2 m. Thus it can easily be handled by a single person and can be transported on a pallet.

The module further comprises internal electronics comprising a collection of functionalities allowing fully autonomous operation. Thus the module comprises:

- its own energy source, for example in the form of batteries. Alternatively, it is also possible to connect it to the electrical mains supply,
- means of measuring the condition of the tires, for example tire wear measurement sensors or tire pressure measurement sensors. In the case of wear measurement sensors, these sensors may use an alternating magnetic field source, such as, for example, in the case of eddy current sensors or variable-reluctance sensors. Alternatively, these sensors may also use a static magnetic field source.
- data transmission means making it possible to communicate with a web gateway 6 positioned nearby,
- means of identifying the tires and the vehicles, for example an RFID reader.
- a clock, allowing a measurement date and clock signal time to be associated with every measurement.

Moreover, the individual module is provided with means of collaboration intended to allow several individual model modules to be combined to form a complete system for assessing the condition of the tires. These means of collaboration may be mechanical, to allow the modules to be physically assembled, or electronic, to allow the measurements taken by various modules to be reconstituted.

The gateway 6 is a communications relay relaying data between the individual modules and a remote database. This gateway is therefore provided with means of receiving information coming from the modules and with means of transmission to the said remote database.

Furthermore, the gateway 6 is also equipped with its own clock, allowing it to know the date and clock signal time of reception of the messages received from the individual modules.

Figure 2A:
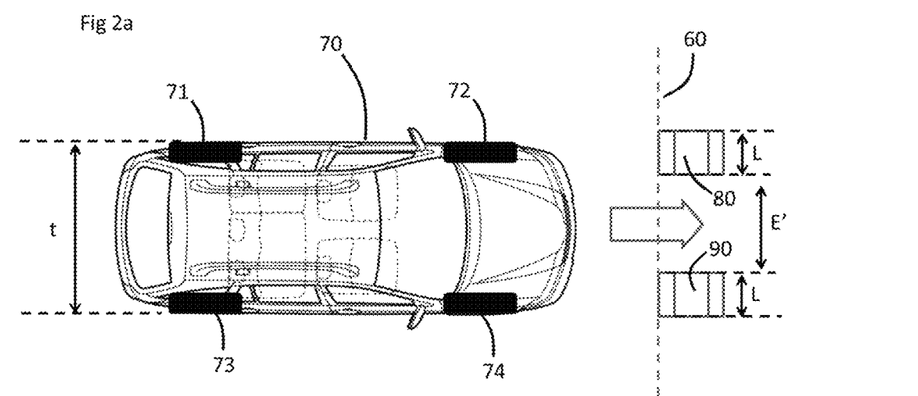
FIGS. 2a, 2b and 3 show various arrangements of individual modules in a system according to the invention.

FIG. 2a shows a first exemplary embodiment of a system for measuring the condition of tires according to the invention.

In this example, the system for measuring the condition of the tires is made up of two modules 80 and 90. Thus it is suited to measuring the condition of tires on passenger vehicles.

It should be noted that the separation E' between the two modules is chosen so that the tires situated on the left-hand side of a vehicle are measured by the module 80, when the tires situated on the right-hand side of the vehicle are measured by the module 90.

Thus, as a vehicle passes over the system shown in this example, each module makes an assessment of the condition of the tires situated on one side of the vehicle. The measured data are then transmitted to the gateway 6 so as to be transmitted later, either periodically or when the tire leaves the measurement system, to a remote database.

In order to avoid simultaneous transmission from the modules 80 and 90 to the gateway, as this could create interference, or even failures, in the information transmitted, use is made in one exemplary embodiment of an information transmission protocol referred to as "Listen Before Talk". In this protocol, if the module 80 wishes to transmit its measurement result, it first of all enters receive mode for a random length of time, so as to detect potential transmission of a message by another module. Advantageously, this listening time is of the order of around ten milliseconds. If no message is in the process of being transmitted by another module, the module 80 sends the result of its measurement to the gateway 6. If not, the module once again enters receive mode while it waits to be able to transmit this data.

Figure 2B:
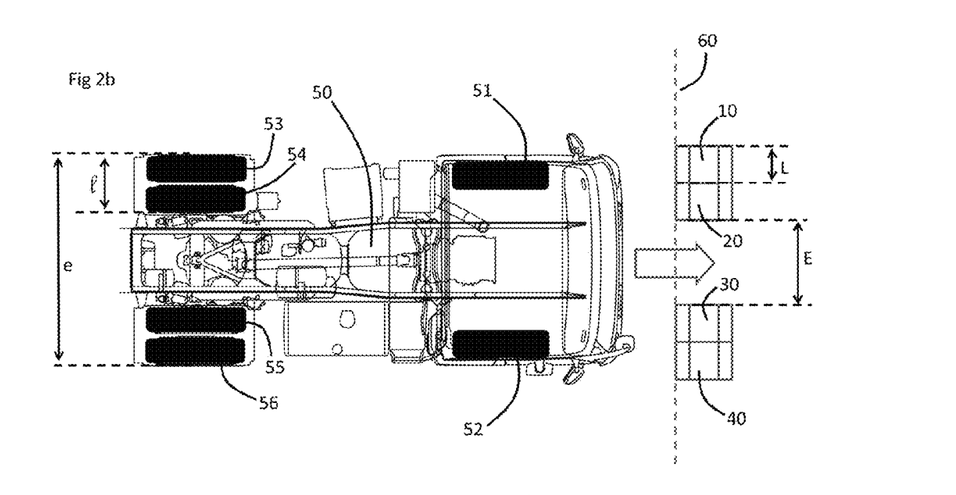

FIG. 2b shows a second exemplary embodiment of a system for measuring the condition of tires that combines several modules identical to that of FIG. 1.

In this example, the system for measuring the condition of the tires is made up of four modules 10, 20, 30 and 40 which are identical to the modules 80 and 90 of FIG. 2a. These modules are placed on the ground along a line 60. They are adjacent in pairs and thus form two subsets.

In this example, the separation E between the two subsets is advantageously chosen so that when a vehicle of the heavy duty type 50 arrives to face the tire condition measurement system thus formed, the tires situated on the left-hand side of the vehicle pass over the subset made up of the modules 10 and 20, while the tires situated on the right-hand side of the vehicle pass over the subset made up of the modules 30 and 40.

The width L of the modules may advantageously be chosen so that when a subset of several modules is created, the overall length of the said subset is greater than the transverse dimension $\ell$ of the twinned tires of the heavy-duty vehicle the tire condition of which is being assessed. In this way, it is possible to assess the condition of all the tires of the vehicle 50 in a single pass.

It should be noted that it is possible to use individual modules the width L of which is great enough to cover the area needed to measure the condition of twinned tires, although such modules are far less practical to transport and to install.

In this example, it is possible for the tires of the vehicle to straddle two modules belonging to the one same subset. In that case, the tire concerned will be measured in part by a first module and in part by a second module, adjacent to the first, and this will lead to two partial measurements. In that case, the system needs to be provided with means of collaboration so that the tire condition measurement can be reconstituted in its entirety.

A first reconstitution strategy is to perform regular synchronization between each of the modules and the gateway 6 described in FIG. 1. In order to do this, the modules at regular intervals transmit the clock signal indicated by their internal clock to the gateway 6. Thus, the discrepancy between the clocks of each of the modules and the clock of the gateway is known.

When a tire is measured while it is straddling two modules, each module transmits the partial information it has gathered to the gateway, accompanied by the clock signal of the measurement as indicated by the internal clock of that module.

On receiving the information, the gateway, having a measured the current discrepancy between the modules and its own clock, can time-adjust the measurements and thus detect that these measurements have been performed at the same moment.

Furthermore, the system for example takes a reading of an RFID identifier positioned on the vehicle so as to identify the vehicle the tire conditions of which are being measured. The said vehicle, the number and the size of the tires fitted to it are known in the remote database to which each module is connected. Thus, when the information set is transmitted to the database (the vehicle identifier, the measurements and the time and date stamp on the measurements performed by each module, the time and date stamp for reception and transmission of the data by the web gateway), it becomes possible to detect that the partial measurements have been taken on two distinct parts of the one same tire.

In practice, this work of detecting partial measurements, of reconstructing complete measurements for each tire, and of associating the set of measurements with an identified vehicle, is handled by a scientific engine present in the information system and connected to the database.

This association by time-adjustment may also be performed in a remote server if the gateway communicates the necessary information to the said server. In that case, the gateway regularly sends the server its internal clock signal associated with the internal clock signal of each of the modules. At the moment of measurement, it also confines itself to passing on each measurement associated with the clock signal of the relevant module and with its own clock signal.

In another exemplary embodiment, each module transmits the measurement taken, associated with the clock signal for the measurement, and with the clock signal for transmission of the information to the gateway 6. Assuming that the transmission time is zero, the gateway 6 can then time-adjust the measurements relative to one another and detect measurements that have been taken at identical times by using its own clock to calculate the discrepancies in clock signal between the modules within the same tire condition measurement system.

Yet another solution is to equip each module with very short-range means of communication with the other adjacent modules. In that case, it is possible to perform synchronization by exchange of information between adjacent modules, without passing via the gateway 6.

Yet another solution is to regularly communicate the state of the clock of the gateway 6 to each of the modules, so as to force the modules to follow the clock signal of the gateway 6. However, that solution is less advantageous because it forces the modules to operate in receive mode, which is less attractive from the standpoint of the electrical power consumption of the internal electronics of the modules.

Another way of reconstituting a full tire measurement may be used when the tires contain RFID identifying chips.

In that case, as the modules are each equipped with an RFID reader, it is possible to send the partial tire measurements to the gateway 6, accompanied by the tire identifier detected during measurement.

In a second stage, the gateway, or the remote server, may combine the partial measurements taken, using the knowledge of the identifiers of the tires on which these measurements have been taken.

Figure 3:
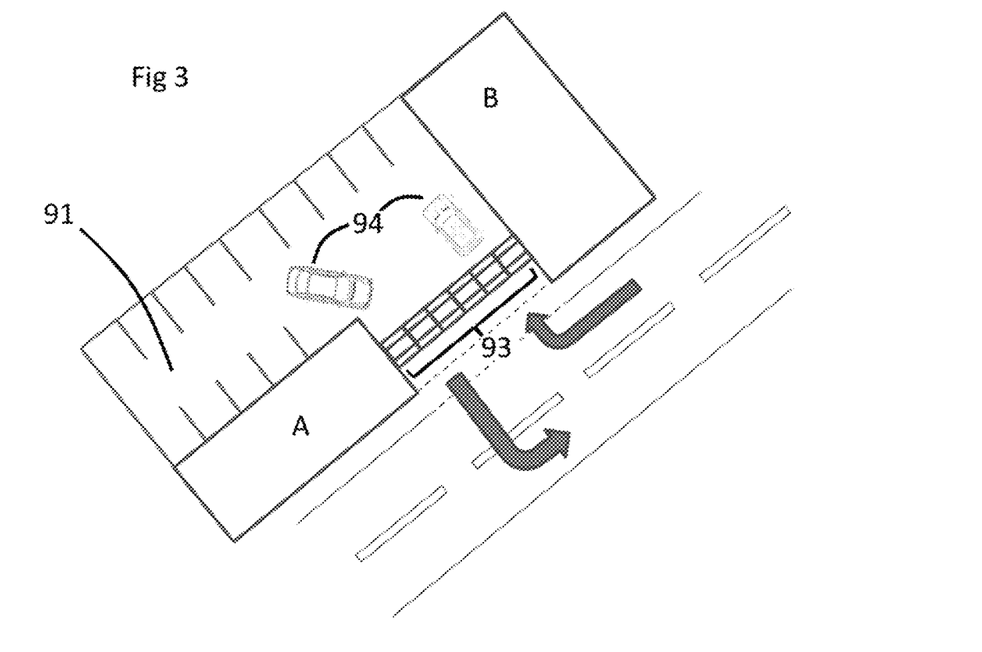

FIG. 3 illustrates another embodiment of a system for measuring the condition of the tires using the modules described in FIG. 1.

In this example, a row of modules 93 is created by combining six modules identical to the module described in FIG. 1. This row is arranged at the entrance to a car park 91. This entrance to the car park 91 is situated between two buildings A and B.

This configuration is particularly advantageous because it allows the tire condition of all kinds of vehicles 94 entering the car park 91 to be measured, whatever the precise point at which the vehicles 94 cross the row 93, both when entering and when leaving.

Figure 4:
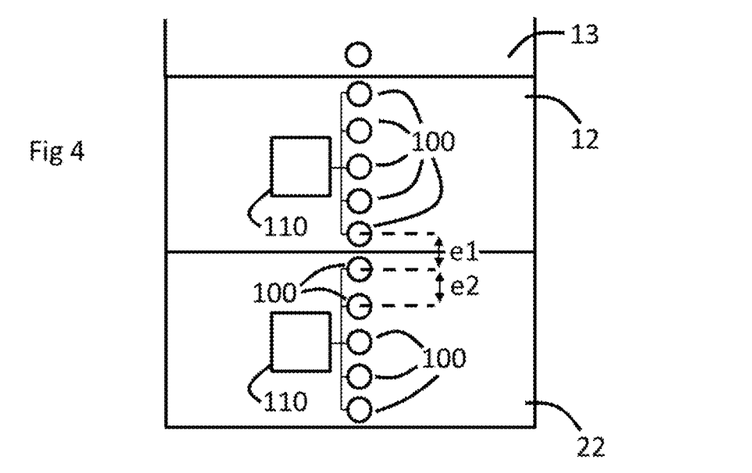
FIGS. 4 and 5a to 5d show details of individual modules used in the configuration of FIG. 3, FIGS. 6a to 6c show embodiment details of an individual module such as shown in FIG. 1, and FIGS. 7 and 8 show a system according to the invention in which the individual modules have a particular shape.

FIG. 4 shows the detail of the inside of two modules situated at an end of the row 93 described in FIG. 3. The module 22 is situated against building B. The module 12 is situated between two modules 13 and 22.

These modules are equipped with sensors 100 arranged in a row, uniformly spaced with respect to one another and connected to measurement and information transmission electronics 110.

In the case of FIGS. 3 and 4, the sensors 100 use a magnetic field source. This may for example be the case encountered in the case of sensors that measure the thickness of the layer of rubber material that operate on the eddy current principle or on the variable reluctance principle.

Thus, the magnetic field emitted by each sensor may interfere with the sensors adjacent to it. This is referred to as interactions between sensors. The interactions between sensors do not cause a problem if they are all the same from one sensor to another. This situation in which the interactions are identical is achieved when each sensor is situated along a row, between two groups of sensors made up of at least two identical sensors, and when the distance separating the sensors is always the same.

In order for this condition to be met, the separation e1 between two sensors respectively belonging to two adjacent modules needs to be the same as the separation e2 between the sensors situated within the one same module. In order to achieve this, the distance between the sensors 100 situated at the ends of the modules and the exterior edge of the housing of the modules needs to be equal to e2/2. When this condition is met, and the modules are installed so that they are perfectly adjacent, e1=e2.

This feature is also a condition of correct operation of the tire condition measurement system described in FIG. 2b.

Moreover, in order for a system combining several modules to be able to take precise measurements, it needs to be calibrated beforehand. This calibration needs to take account of the magnetic environment of each sensor 100 belonging to the system. In order to guarantee that, when a module is manufactured, calibration is performed in two different ways. A first calibration is performed on the module alone. A second calibration is performed on the module positioned between two adjacent modules, as is the module 12 in FIG. 4. The correction coefficients for each sensor, which are obtained as a result of these calibrations, are then stored in the database to which each module of the system is connected, via the gateway 6 described in FIG. 1.

Depending on the embodiment, the measurements performed by each sensor of each module of the system are corrected by taking account of the presence or non-presence of adjacent modules within the system.

Thus, in the case of the module 22, the correction coefficients used to correct the measurements taken by the sensors situated in the half of the module closest to building B, will be the calibration coefficients obtained with one module alone.

By contrast, the correction coefficients used to correct the measurements taken by the sensors situated in the half of the module closest to the module 12, will be the calibration coefficients obtained with a module positioned between two adjacent modules.

Figure 5A:
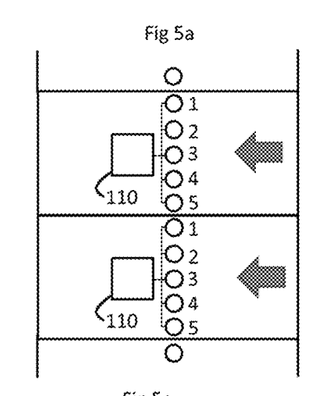
Figure 5B:
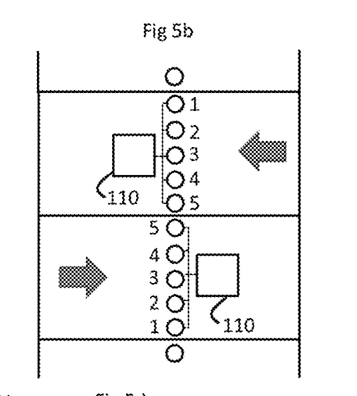

FIGS. 5a and 5b show details of two other modules situated within the row 93 described in FIG. 3.

In this drawing, the sensors 100 described hereinabove are numbered from 1 to 5 according to the number of the digital input to which the said sensors 100 are connected in the processing electronics 110.

Thus, depending on the orientation of the modules relative to one another, it is possible to position the sensor connected to input 5 of one module next to the sensor numbered 1 of an adjacent second module. That arrangement is depicted in FIG. 5a.

Alternatively, if one of the modules is turned through 180° with respect to the module adjacent to it, it is possible to position the sensor connected to input 5 of the first module next to another sensor numbered 5 and belonging to the second module.

Thus, even though it is possible to take measurements from the tire in the direction of leaving or entering the car park 91 described in FIG. 3, it is important to know the orientation of the modules relative to one another so as to be able to determine whether measurements made on two adjacent modules are two partial measurements of the one same tire, or whether these are measurements from distinct tires.

Figure 5C:
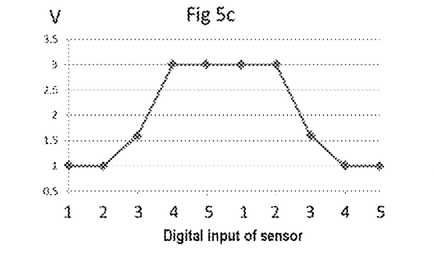
Figure 5D:
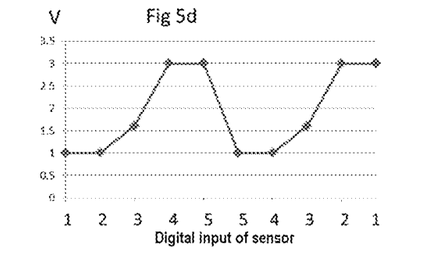

FIGS. 5c and 5d illustrate this problem. The graph in FIG. 5c was obtained by running a tire so that it straddled the two modules shown in FIG. 5a. In this graph, the digital input number corresponding to each sensor is indicated on the abscissa axis and the output voltage of each sensor is indicated on the ordinate axis.

If, through error, the orientation of the modules recorded in the database were that of FIG. 5b, the interpretation visible in FIG. 5d would be the result. In the case of the graph of FIG. 5d, the presence of two distinct voltage spikes would suggest that two twinned tires have passed over the set made up of the two modules. That would be a manifest error.

In order to solve this problem, it is possible for example to record in a remote database the relative orientations of the modules relative to one another. In order to do this a design may advantageously be produced on the surface of the modules, so as to clearly indicate the orientation of the said modules. For example, a design similar to the arrow indicated on each module in FIGS. 5a and 5b. During installation, this design can then be used in order to record in the database the orientation of each of the modules relative to its neighbours.

A simpler approach is to observe the same orientation for all the modules by positioning all the arrows of the one same tire condition measurement system in the same direction. By doing this, a sensor connected to digital input 5 of the electronics 110 of one of the modules is always positioned next to a sensor connected to digital input 1 of an adjacent module. By doing this, the information to be recorded in the database is simpler because the configuration is always the same from one tire condition measurement system to another.

Another measure must be conformed to in order to ensure that a tire condition measurement system like the one described in FIG. 3 can operate. This is that of recording the relative position of the various modules with respect to one another.

The measurement system 93 described in FIG. 3 in fact shows six modules placed on the ground against one another with no space between each of the modules. Each module has a unique identifier specific to it. For example, in the case described in FIG. 3, the modules are numbered between 1000 and 1006.

In order to be capable of reconstituting the measurements of tires passing such that they straddle two modules, but also of automatically detecting that different tires belong to the one same vehicle, the exact geometric configuration of the modules needs to be recorded in the remote database together with their position and respective identifier along the measurement row described by the system 93.

For example, it is possible to distribute the modules starting from building A and extending to building B by adhering to the following number order: 1000, 1001, 1002, 1003, 1004, 1005, 1006.

However, it is equally possible to distribute the modules in the following order: 1000, 1002, 1004, 1001, 1003, 1006.

These two configurations are very different and would lead to errors in the interpretation of the measurements if they were not known in the remote database associated with the system 93.

This knowledge in the database of the geometric distribution of the identifiers of the modules within a system made up of several modules on the one hand, and of the relative orientation of the modules with respect to one another on the other, is essential to allowing such systems to operate correctly. The systems described in FIGS. 2a and 2b are therefore affected by this requirement just as is the system described in FIG. 3.

Figure 6A:
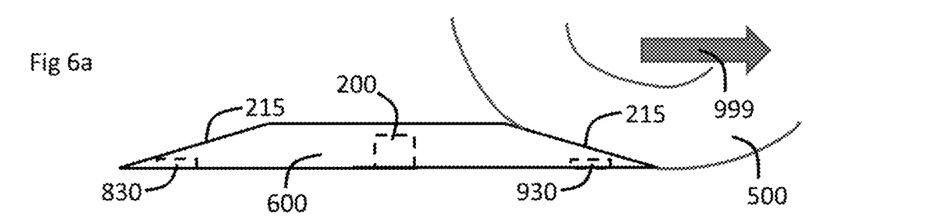
Figure 6B:
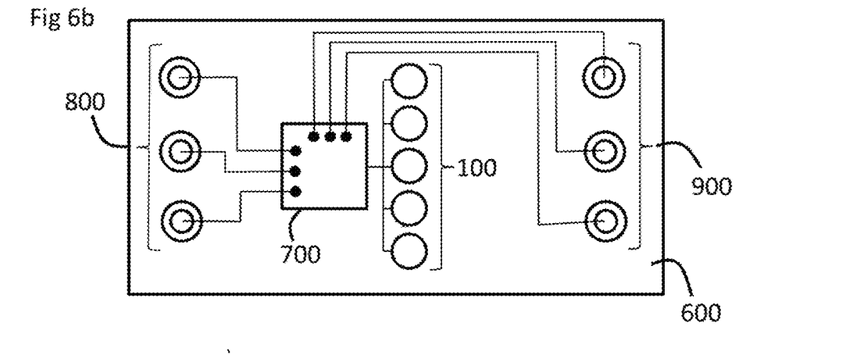

The figures in FIGS. 6a and 6b illustrate a number of additional details of the internal electronics of a tire condition measurement module. This type of module can be used for example in the case of the tire condition measurement system described in FIG. 2b.

This module 600 is provided with housings 200 for the tire condition measurement sensors 100 and with housings 830 and 930 for the tire detection sensors 800 and 900. In the case of FIGS. 6a and 6b, the tire detection sensors are piezoelectric buzzers which generate a positive voltage when a tire 500 arrives on the module 600.

The measurement sensors 100 and tire detection sensors 800 and 900 are in this example connected to central electronics 700.

Figure 6C:
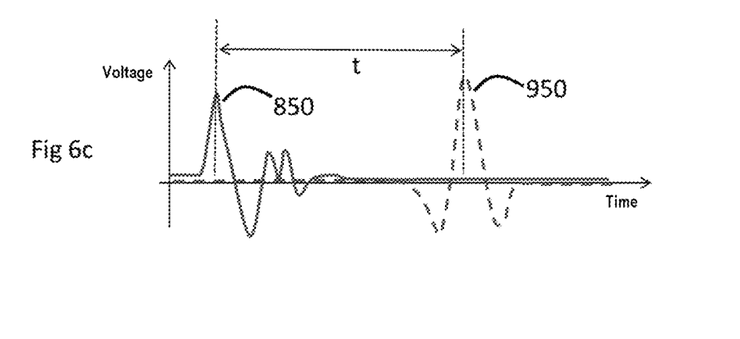

When a tire 500 arrives on the module 600, the piezoelectric buzzers generate a voltage spike at the moment the tire passes. Thus, as illustrated in FIG. 6c, in one example of the passage of a tire, a first spike 850 emitted by the buzzers 800 is detected by the electronics 700 and then, after a time t, a spike 950 is emitted by the buzzers 900.

In this case, the module can determine that the direction in which the tire has passed is the direction indicated by the arrow 999, because the buzzers 800 have been activated before the buzzers 900.

The use of a module equipped with such a system for detecting the running direction may for example, in the case of the system described in FIG. 2b, make it possible to automatically determine the relative orientation of the modules with respect to one another.

Specifically, when a vehicle passes over such a system, because all of the tires present on the vehicle pass over the system in the same direction of running, it is possible to detect the relative orientation of the modules with respect to one another.

In order to do so, the information concerning the direction of running may be sent to the remote server, together with the tire condition measurements. That makes it possible to detect potential inconsistencies in the direction of passing of the tires, as viewed by the system, when the vehicle first passes over the said system. In order to do that, all that would be required would be a comparison against a standard orientation initially defined in the server.

Once the relative orientations of the modules with respect to one another have been correctly registered in the server, it is possible to employ the same procedure in order to check that the system has not changed over time.

Figure 7:
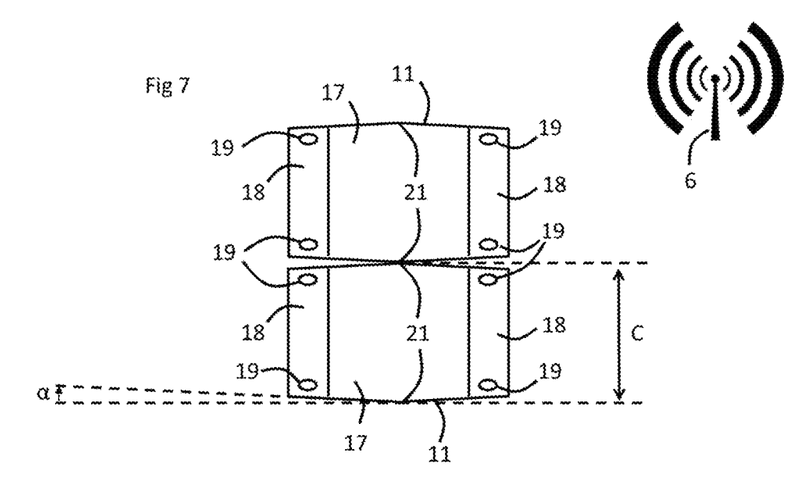

FIG. 7 illustrates an improvement to the geometrical shape of the modules described in FIG. 1. This FIG. 7 shows a tire condition measurement system made up of two identical modules 11.

Each of the modules 11 has a thickness, not indicated, of the order of a few centimetres. For example 4 centimetres.

Each of the modules 11 is made up of two access ramps 18 and of a horizontal tire condition measurement zone 17. Furthermore, the lateral edges of each of the modules are not rectilinear but, starting from a central point 21, make an angle α with the direction of running of the vehicles.

In doing this, the adjacent modules are in contact via a single point 21, making it easier to install the system on the ground by avoiding the creation of a statically indeterminate assembly between the two adjacent modules while at the same time ensuring that the distance between the sensors 100, which are visible in FIGS. 4, 5a and 5b, and present in the same configuration inside these two modules 11 are separated by a constant distance inside the modules and at the interface between two modules 11 in FIG. 7.

Furthermore, as it is not always easy to position modules on the ground using screws, oblong holes 19 have been formed in the access ramps 18 of each of the modules 11. As a result, if the fixing holes in the ground are not correctly positioned, with respect to the geometry of the modules, it is still possible for the two modules to be shifted slightly towards one another in order to ensure contact between the two points 21.

More broadly speaking, it is possible to conceive of numerous mechanical improvements aimed at guaranteeing correct positioning of several associated modules within the same tire condition measurement system.

For example, a rail may be fitted to the ground, on and/or against which the modules are positioned. By doing this, the rectilinear arrangement of the system thus formed is guaranteed and the correct relative positioning of the sensors 100 described hereinabove from one module to another is easier.

Figure 8:
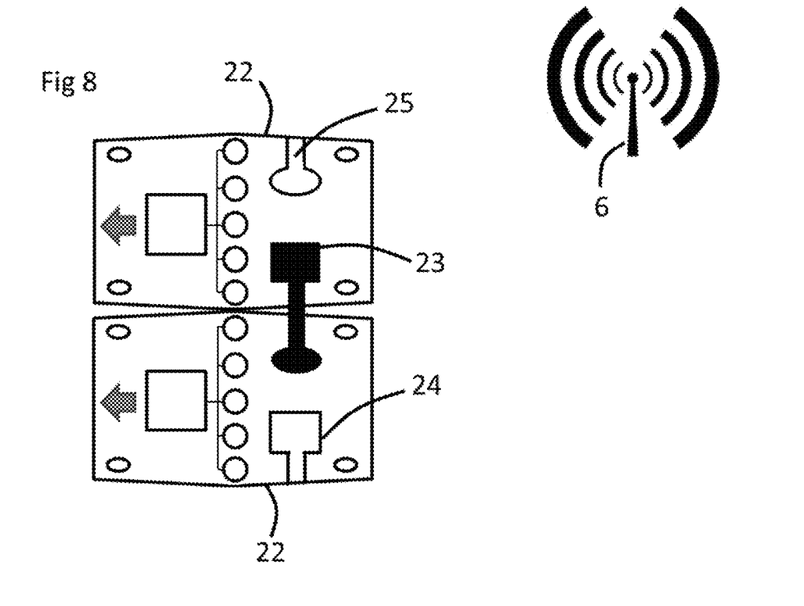

It is also possible to conceive of attaching to the modules fishplates that allow the modules to be joined together, locking the relative positions of the modules with respect to one another, before fixing them to the ground. These fishplates may also have ends with different geometric shapes and fit into the modules in suitable housings. By doing this, this setup guarantees not only the correct positioning of the sensors 100 with respect to one another but also the relative orientation of the modules with respect to one another. This last arrangement is illustrated in FIG. 8 which shows two identical modules 22 in a view from beneath, mounted against one another by means of a fishplate 23 the geometric shape of which differs at these ends. This fishplate 23 is positioned in housing 25 and 24 of suitable shape, so as to ensure the positioning and relative orientation of the modules with respect to one another.

The invention claimed is:

1. A system for assessing a condition of a tire, the system comprising:
    first and second individual modules structured to assess a condition of a tire, each of the first and second individual modules including:
        a housing structured to be placed on a ground surface, the housing containing therein at least one detection device that enables a parameter of the tire to be assessed as the tire passes over the housing, and
        a data transmitter;
    a data-transmission gateway structured to transmit data between the first and second individual modules and a remote database; and
    a collaboration device structured to enable data from the first individual module to be used collaboratively with data from the second individual module.

2. The system according to claim 1, wherein the first and second individual modules are positioned adjacent to each other.

3. The system according to claim 1, wherein the collaboration device includes a clock synchronizer structured to synchronize internal clocks of the first and second individual modules.

4. The system according to claim 1, wherein the collaboration device includes a time adjuster.

5. The system according to claim 1, wherein each of the first and second individual modules includes an RFID chip reader.

6. The system according to claim 1, wherein the at least one detection device of each of the first and second individual modules includes at least one sensor that uses a magnetic field source.

7. The system according to claim 6, wherein the first and second individual modules and the sensors of the first and second individual modules are positioned in such a way that a distance between two adjacent sensors of the first and second individual modules is constant regardless of whether the two adjacent sensors are both installed in a same one of the first and second individual modules or are separately installed in a different one of the first and second individual modules.

8. The system according to claim 1, wherein the remote database stores information indicative of a positioning of the first and second individual modules relative to each other.

9. The system according to claim 1, wherein the collaboration device includes a mechanical device.

10. The system according to claim 1, wherein the collaboration device reconstructs a complete measurement from partial measurements taken on a same tire.

* * * * *

UNITED STATES PATENT AND TRADEMARK OFFICE
CERTIFICATE OF CORRECTION

PATENT NO. : 10,639,945 B2
APPLICATION NO. : 15/746290
DATED : May 5, 2020
INVENTOR(S) : Thomas Ledoux et al.

It is certified that error appears in the above-identified patent and that said Letters Patent is hereby corrected as shown below:

On the Title Page

At item (56), References Cited, Other Publications, p. 2:
Line 1, "$1^{ADDAC;Aaere}$" should read --$1^{ère}$--.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*